United States Patent [19]
Yamaguchi et al.

[11] Patent Number: 5,210,674
[45] Date of Patent: May 11, 1993

[54] SUPERCONDUCTING COIL PROTECTIVE SYSTEM

[75] Inventors: Satarou Yamaguchi; Tadanori Tsukamoto, both of Tokyo, Japan

[73] Assignee: Mitsubishi Denki Kabushiki Kaisha, Tokyo, Japan

[21] Appl. No.: 707,326

[22] Filed: May 29, 1991

[30] Foreign Application Priority Data

May 31, 1990 [JP] Japan ................... 2-140022
Jun. 29, 1990 [JP] Japan ................... 2-169880
Jun. 29, 1990 [JP] Japan ................... 2-169887

[51] Int. Cl.$^5$ .......................................... H02H 7/00
[52] U.S. Cl. ............................................ 361/19; 361/4;
    361/58; 361/11; 361/141; 505/850
[58] Field of Search .................. 361/4, 3, 19, 58, 10,
    361/11, 111, 141; 505/850, 881

[56] References Cited

U.S. PATENT DOCUMENTS 4,740,858  4/1988  Yamaguchi et al. ............... 361/4
4,855,859  8/1989  Tixador et al. .................. 361/19

FOREIGN PATENT DOCUMENTS 1564700  9/1966  Fed. Rep. of Germany .

OTHER PUBLICATIONS

"Improvements in the Parallel Resistor Circuit for the Quench Protection of a Superconducing Magnet" by T. Nakano et al. B-102 No. 12 pp. 73-79, from Japanese Institute of Electrical Engineering, Dec. 1982.

Primary Examiner—Todd E. DeBoer
Attorney, Agent, or Firm—Leydig, Voit & Mayer

[57] ABSTRACT

A superconducting coil protective system comprises a quenching detector (QD) for detecting occurrence of a quenching in a superconducting coil (L) and generating a quenching signal indicative of the occurrence of the quenching. In response to the quenching signal, a voltage controller (VC) reduces an output voltage from a power source (PS) to zero or to a negative polarity. A current interrupter (CI) including a circuit breaker (CB) or a fuse (F) is connected in parallel to the superconducting coil (L) for allowing a first commutation of a current from the superconducting coil (L) to the current interrupter (CI) upon the reduction of the output voltage from the power source (PS). The system also comprises a protective resistor (RD) connected in parallel to the current interrupter (CI) for allowing a second commutation of the first-commutated current thereto upon the opening of the current interrupter (CI), whereby energy of the second-commutated current is dissipated in the protective resistor. A protective method for the superconducting coil utilizing the above system is also disclosed.

30 Claims, 5 Drawing Sheets

SUPERCONDUCTING COIL PROTECTIVE SYSTEM

BACKGROUND OF THE INVENTION

This invention relates to a superconducting coil protective system and a protective method for protecting a superconducting coil from being destroyed upon quenching.

FIGS. 1 to 4 illustrate circuit diagrams of various superconducting coil protective systems disclosed in "Improvements in the Parallel Resistor Circuit for the Quench Protection of a Superconducting Magnet" by T. Nakano, S. Okuma and Y. Amamiya, B-102 No. 12 pp. 73-79, published by the Japanese Institute of Electrical Engineering in, December, 1982.

In the conventional parallel resistor circuit type protective system illustrated in FIG. 1, a cryostat CR comprises a superconducting coil L and a resistance $R(t)$ of a normal conduction portion generated in the superconducting coil L. This resistance $R(t)$ increases as time passes. Across the cryostat CR, a power source such as a mono-polar electric source E is connected through a power switch S, and a protective resistor $R_D$ is connected in parallel to the cryostat CR.

FIG. 2 illustrates a protective circuit in which a diode D is employed in place of the protective resistor $R_D$ and two switches S1 and S2 as well as three resistors R1, R2 and R3 are used to form a multi-stage parallel resistance.

FIG. 3 illustrates a protective circuit in which series-connected resistors Ra and Rb are connected in parallel to the cryostat CR, and a capacitor C is connected across the resistor Rb. The protective circuit illustrated in FIG. 4 further comprises a series circuit of an inductor Ls and a resistor Rs connected in parallel to the protective resistor.

All of these known protective circuits illustrated in FIGS. 1 to 4 comprise the power switch S connected between the power source E and the superconducting coil L. This power switch S is closed during normal operation, and a very large current from the power source E flows through the superconducting coil L, but substantially no current flows through the protective resistor $R_D$ because it has a large resistance.

However, upon the occurrence of quenching in the superconducting coil L, in order to quickly remove stored energy within the superconducting coil L, as soon as the occurrence of the quenching in the superconducting coil L is detected, the voltage of the power source E is decreased and at the same time the power switch S is opened. Then, a high voltage Vc which generated across the power switch S is applied to the protective resistor $R_D$, whereupon an electric current which previously flowed through the superconducting coil L begins to flow as indicated by the arrow $i_c$. Then, the magnetic energy stored in the superconducting coil L is converted into heat in the protective resistor $R_D$ to be dissipated to the exterior of the cryostat CR, whereby the superconducting coil L can be protected.

With the conventional protective system discussed above, the power switch must carry an extremely massive current, which also flows through the superconducting coil, during normal operating condition, and the power switch must interrupt this massive current at a high voltage upon the occurrence of quenching in the superconducting coil. In fact, the design specification for a superconducting plasma experiment apparatus (also called LHD) planned by the Fusion Science Laboratory of the, Ministry of Education of the, Japanese Government includes a continuous current of 20 kA, to 30 kA and a voltage of 6 kV is generated at the time of interruption. A power switch having ratings which satisfy the above design specification is inevitably very large and very expensive.

SUMMARY OF THE INVENTION

Accordingly, one object of the present invention is to provide a superconducting coil protective system free from the above discussed problems of the conventional design.

Another object of the present invention is to provide a superconducting coil protective system which does not need a power switch.

Another object of the present invention is to provide a superconducting coil protective system which is simple and inexpensive.

A further object of the present invention is to provide a superconducting coil protective method which can effectively and efficiently protect a superconducting coil.

With the above objects in view, according to the present invention, a superconducting coil protective system for protecting a superconducting coil connected in parallel to a power source comprises a quenching detector for detecting occurrence of a quenching in the superconducting coil and generating a quenching signal indicative of the occurrence of a quenching. A voltage controller is provided for reducing an output voltage from the power source in response to the quenching signal. The system also comprises a current interrupter including a circuit interrupter or a fuse connected in parallel to the superconducting coil for allowing a first commutation of a current from the superconducting coil to the current interrupter upon the reduction of the output voltage from the power source to a first voltage at which the first commutation occurs. A first switch which closes in response to the quenching signal is connected in series with the current interrupter and in parallel to the superconducting coil. Connected in parallel to the current interrupter is a protective resistor for allowing a second commutation of the first-commutated current upon the opening of the current interrupter, whereby energy of the second-commutated current is dissipated in the protective resistor.

According to a superconducting coil protective method for protecting a superconducting coil, when occurrence of a quenching in the superconducting coil is detected, a quenching signal indicative of the occurrence of a quenching is generated. Then, an output voltage from the power source is reduced in response to the quenching signal to a first voltage at which a first commutation of a current from the superconducting coil to a current interrupter connected in parallel to the superconducting coil upon the reduction of the output voltage from the power source occurs. Then, when the current interrupter is opened, a second commutation of the first-commutated current to a protective resistor connected in parallel to the current interrupter takes place, whereby energy of the second-commutated current is dissipated in the protective resistor.

BRIEF DESCRIPTION OF THE DRAWINGS

The present invention will become more readily apparent from the following detailed description of the preferred embodiments of the present invention considered in conjunction with the accompanying drawings, in which.

DESCRIPTION OF THE PREFERRED EMBODIMENTS

Figure 1:
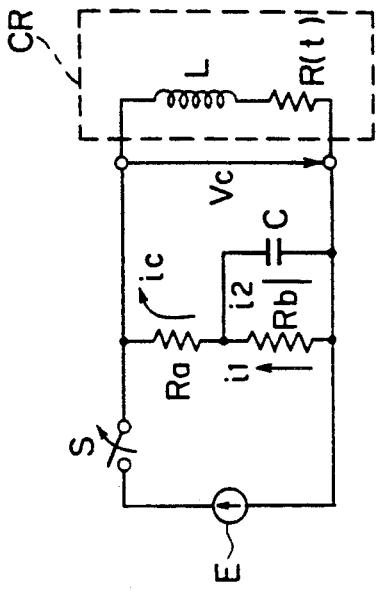
FIG. 1 is a circuit diagram illustrating one example of a conventional superconducting coil protective system.
Figure 2:
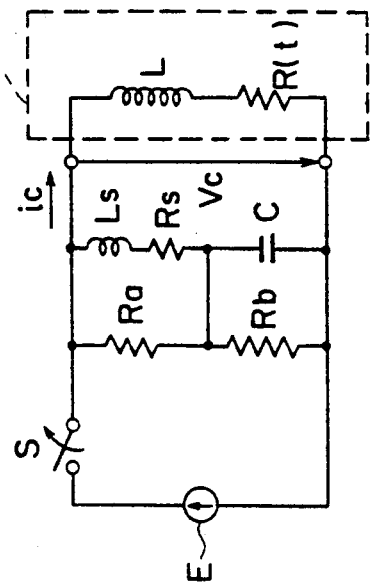
FIG. 2 is a circuit diagram illustrating another example of a conventional superconducting coil protective system.
Figure 3:
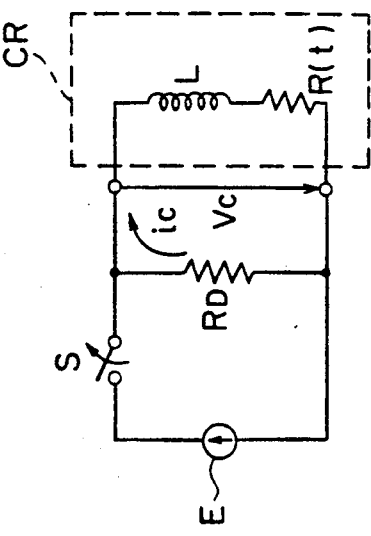
FIG. 3 is a circuit diagram illustrating a further example of a conventional superconducting coil protective system.
Figure 4:
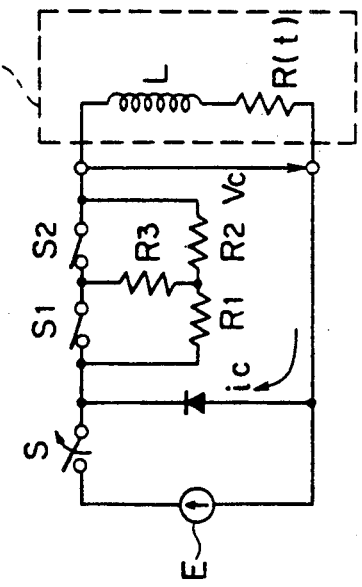
FIG. 4 is a circuit diagram illustrating another example of a conventional superconducting coil protective system.
Figure 5:
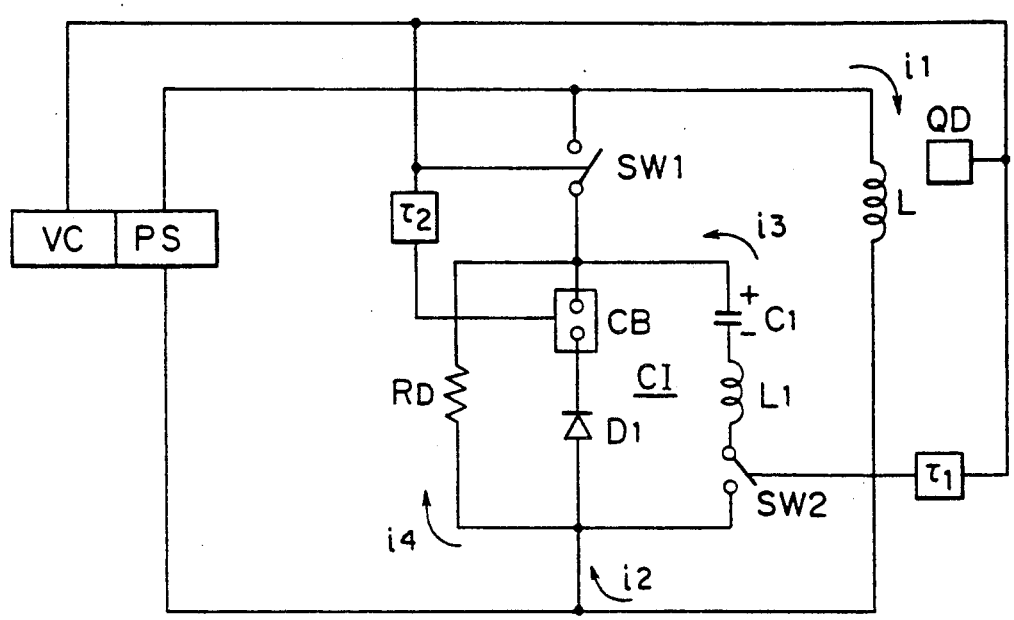
FIG. 5 is a circuit diagram illustrating one embodiment of the superconducting coil protective system of the present invention.

FIG. 5 illustrates a superconducting coil protective system of the present invention for protecting a superconducting coil L connected to a power source PS. The superconducting coil protective system comprises a quenching detector QD which may be any known quenching detector such as a bridge-type detector for detecting occurrence of quenching in the superconducting coil L and generating a quenching signal indicative of the occurrence of quenching in the superconducting coil L.

The quenching detector QD is connected to a voltage controller VC associated with the power source PS so that the signal generated by the quenching detector QD is supplied to the voltage controller VC which reduces the output voltage from the power source PS in response to the quenching signal. The voltage controller VC may be any known controller such as a thyristor or a GTO thyristor as long as the voltage controller VC can reduce the output voltage to a first voltage at which a first commutation (which will be explained in detail later) takes place.

The protection system also comprises a current interrupter CI connected to the superconducting coil L through a first switch SW1 which is usually open but is closed in response to the quenching signal supplied from the quenching detector QD. The current interrupter CI allows a first commutation of current from the superconducting coil L when the first switch SW1 is closed and when the output voltage from the power source PS is reduced by the voltage controller VC to the first voltage at which the first commutation occurs and which is determined by the relationship between the impedance of the power source PS and the impedance of the circuit composed of the current interrupter CI and the first switch SW1.

The current interrupter CI comprises a first series circuit including a circuit breaker CB and a diode D1 and a second series circuit including a capacitor C1, an inductance L1 a second switch SW2 and connected in parallel to the first series circuit. The second switch SW2 is normally open and is arranged to close upon the occurrence of quenching in the superconducting coil L with a predetermined time lag corresponding to a very short period of time necessary for completing the first commutation of the current.

The superconducting coil protective system further comprises a protective resistor RD connected in parallel to the current interrupter CI for allowing a second commutation in which the first-commutated current is commutated to the protective resistor RD upon the opening of the current interrupter CI. The protective resistor RD has a resistance large enough to convert the energy of the second-commutated current which corresponds to the electromagnetic energy stored in the superconducting coil L into heat which can be dissipated by the protective resistor RD.

During normal operation of the superconducting coil apparatus, no quenching occurs in the superconducting coil L and no quenching signal is provided from the quenching detector QD. Therefore, the first switch SW1 is opened and the voltage controller VC allows a predetermined current $i_1$ to be supplied from the power source PS to the superconducting coil L. The circuit breaker CB in the current interrupter CI is closed and the second switch SW2 is opened so that an electrical charge on the previously charged capacitor bank C1 is maintained.

When quenching is detected by the quenching detector QD, a quenching signal is generated. The quenching signal causes the voltage controller VC associated with the power source PS to decrease the output voltage from the power source PS and causes the first switch SW1 to close. The decrease of the output voltage from the power source PS is continued until the polarity of the output voltage is reversed. This can be done by means of GTO thyristor. As the current $i_1$ flowing through the superconducting coil L begins to decrease slightly, the current from the power source PS decreases rapidly and a current $i_2$ flowing through the current interrupter CI (or the current through the diode D1, the circuit breaker CB and the first switch SW1) increases rapidly. When the output voltage from the power source PS decreases to a first voltage at which the current flowing through the power source PS becomes zero and all the current $i_2$ from the superconducting coil L flows through the current interrupter CI, the power source PS is electrically isolated from the superconducting coil L and the current commutation is completed. This current commutation as described above is referred to as a first commutation.

Then, the second switch SW2 is closed in response to the quenching signal from the quenching detector QD but with a certain time lag $\tau_1$ which corresponds to a period of time necessary for the first commutation to be completed after the occurrence of the quenching in the superconducting coil L. Then, the electrical charge on the capacitor bank C1 discharges as a current indicated by arrow $i_3$ through the circuit breaker CB. Since the commutated current $i_2$ and the current $i_3$ are opposite in direction relative to the circuit breaker CB, and since the capacitor, bank C1 is selected to have discharge current is sufficient to reduce the current $i_2$ to zero, the current flowing through the circuit breaker CB is reduced to zero. In the illustrated embodiment, this discharge current $i_3$ is greater than the current $i_2$ so that the direction of the resultant current $(i_2-i_3)$ through the circuit breaker CB is reversed. However, since the diode D1 is connected to the circuit breaker CB, no current flows through the circuit breaker CB and the period of time during which the current through the circuit breaker CB is zero is not a time point but has a certain time span. This makes current interruption at the circuit breaker CB very easy.

Therefore, the circuit breaker CB can now be opened in response to the quenching signal with a suitable time lag $\tau_2$ without generating an electric arc across the separating contacts and the current flowing through the current interrupter CI is interrupted. Then, the current $i_2$ flowing through the current interrupter CI is commutated as a commutated current $i_4$ flowing through the protective resistor RD connected in parallel to the current interrupter CI, whereby the energy of the this current $i_4$ is dissipated as heat generated at the protective resistor RD. This commutation of the current $i_2$ to the current $i_4$ is referred to as a second commutation.

As has been described, the superconducting coil protective system comprises a parallel circuit of a protective resistor and a current interrupter connected in parallel to the superconducting coil, so there is no need to use a power switch of high long-time ratings which has been required for carrying an extremely massive current for an elongated period of operation of the superconducting coil apparatus, and all the switches used in the protective system can have short-time ratings. Therefore, the protective system can be made compact in overall dimensions and less expensive. Also, since an a.c. circuit interrupter can be used in the protective system of the present invention, it is not necessary to develop a large d.c. current circuit interrupter of long-time ratings.

When the voltage controller VC is of type that the polarity of the output voltage from the power source PS cannot be reversed and the output voltage can be simply reduced to zero, the first switch SW1 illustrated in FIG. 5 is not necessary because the diode D1 prevents current from the power source PS from flowing through the circuit breaker CB.

Figure 6:
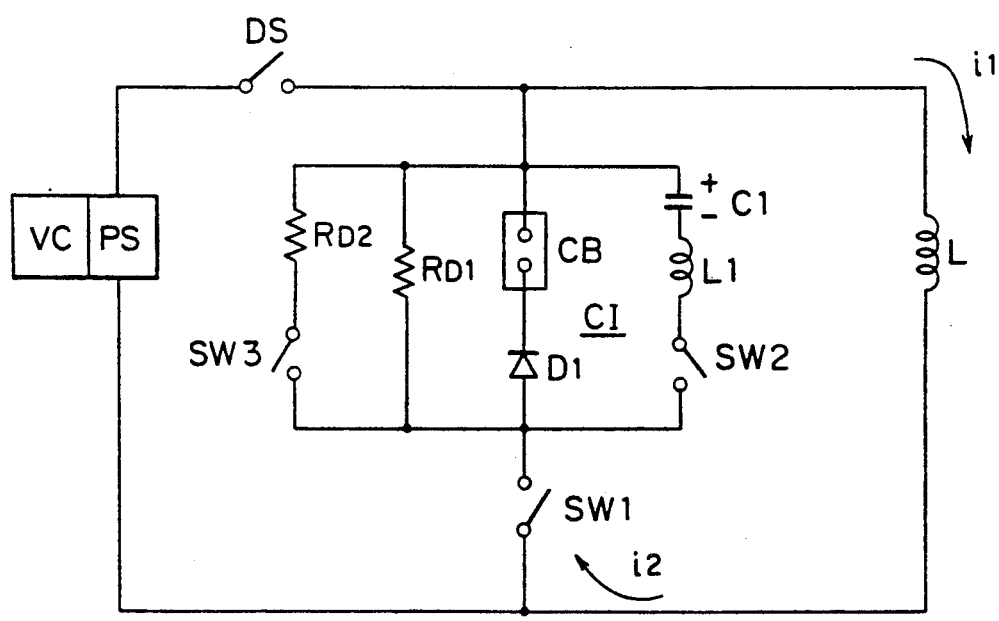
FIG. 6 is a circuit diagram illustrating another embodiment of the superconducting coil protective system of the present invention in which a disconnector and a additional protective resistor are added to the arrangement shown in FIG. 5.

FIG. 6 illustrates another embodiment of the superconducting coil protective system of the present invention. Comparing FIG. 6 with FIG. 5, it is seen that the control system such as the quenching detector QD, the voltage controller VC, and the signal lines connecting the components are omitted from the circuit diagram of FIG. 6. The protective system of this embodiment has the same basic structure but additionally comprises a disconnector DS connected in series with the power source PS, which is opened upon the completion of the first commutation of the current from the superconducting coil (L), and a second protective resistor RD2 connected through a third switch SW3 in parallel to the first protective resistor RD1.

The protective operation of the protective system of this embodiment is similar to that illustrated in FIG. 5 except for that of the disconnector DS and the second protective resistor RD2. The disconnector DS is normally closed but is opened in order to protect the power source PS when the first commutation, in which current $i_2$ flows through the current interrupter CI, has been completed and the power source PS is electrically isolated from the superconducting coil L. The operation of the disconnector is automatically achieved at substantially the same time as the closing of the second switch SW2 in the current interrupter CI in response to the quenching signal with a suitable time delay $\tau_1$.

The function of the second protective resistor RD2 and the third switch SW3 is to make the protective resistance value adjustable so that the time constant of the dumping of the current of the superconducting coil L may be adjusted to a proper value. When a current dumping time for a particular superconducting coil L in which the quenching took place is very short as compared to the above proper value, it often happens that the electromagnetic energy in another superconducting coil L in which no quenching is taking place is increased in correspondence with the damping rate of the quenched superconducting coil L.

Figure 7:
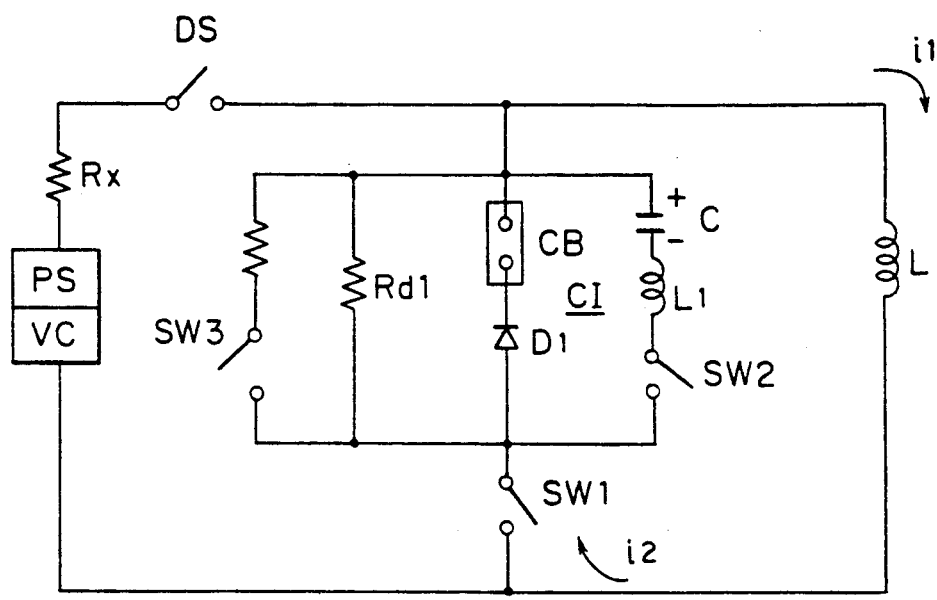
FIG. 7 is a circuit diagram illustrating another embodiment of the superconducting coil protective system of the present invention in which a series resistor connected to the power source is added to the circuit illustrated in FIG. 6.

FIG. 7 illustrates another embodiment of the protective system of the present invention in which a commutation resistor Rx is inserted between the power source PS and the disconnector DS. The commutation resistor Rx is useful in reducing the time needed for the current commutation when the polarity of the electric power from the power source PS cannot be reversed. The commutation condition under these circumstances can be expressed by $Rx > Ry$, where Ry is the resistance of the circuit including the first switch SW1, the diode D1 and the circuit breaker CB, and the resistances of the disconnector DS, the power source PS and the circuit conductors are neglected.

Figure 8:
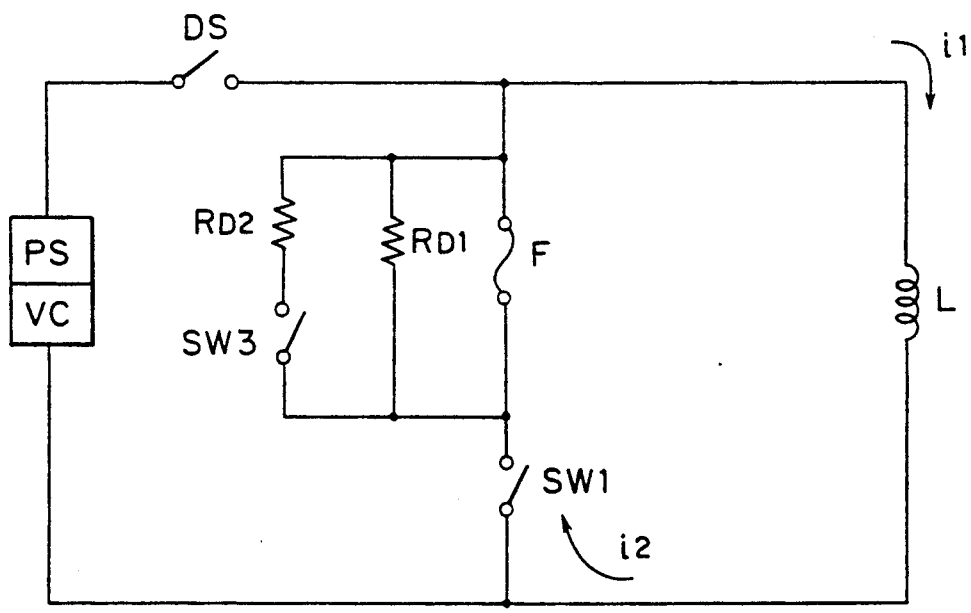
FIG. 8 is a circuit diagram illustrating a further embodiment of the superconducting coil protective system of the present invention in which the circuit interrupter shown in FIG. 6 is replaced with a fuse.

FIG. 8 illustrates a further embodiment of the superconducting coil protective system of the present invention in which the circuit breaker CB of the current interrupter CI of the protective system illustrated in FIG. 7 is replaced with fuse F. The operation of this protective system is basically similar to that of the previous embodiment illustrated in FIG. 6 except that of the current interrupter CI.

When quenching is detected by the quenching detector QD, the output voltage from the power source PS is decreased and the first switch SW1 is closed. As the current through the superconducting coil L begins to decrease slightly, the current from the power source PS decreases rapidly and a current flowing through the fuse F increases rapidly, and the first commutation is completed. Then, the fuse F automatically melts due to the commutated current, and the current which was flowing through the current interrupter CI or the fuse F is commutated to flow through the protective resistor RD1 connected in parallel to the fuse F, whereby the energy of the commutated current is dissipated.

Figure 9:
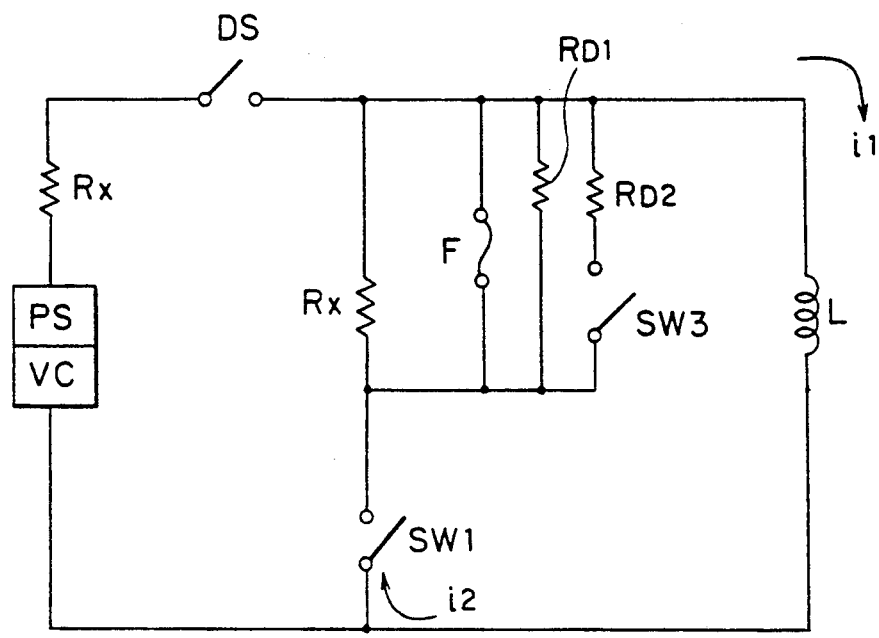
FIG. 9 is a circuit diagram illustrating another embodiment of the superconducting coil protective system of the present invention in which the circuit interrupter shown in FIG. 7 is replaced with a fuse.

When the electrical power from the power source PS cannot be reversed, two commutation resistors Rx may be connected to the power source PS as illustrated in FIG. 9 in order to shorten the commutation time for the first commutation. The commutation condition in this case is Rx×Ry, where Rx is the commutation resistance and Ry is the resistance of the circuit including the first switch SW1 and the fuse F, with the resistances of the power source PS and the circuit conductors neglected.

Figure 10:
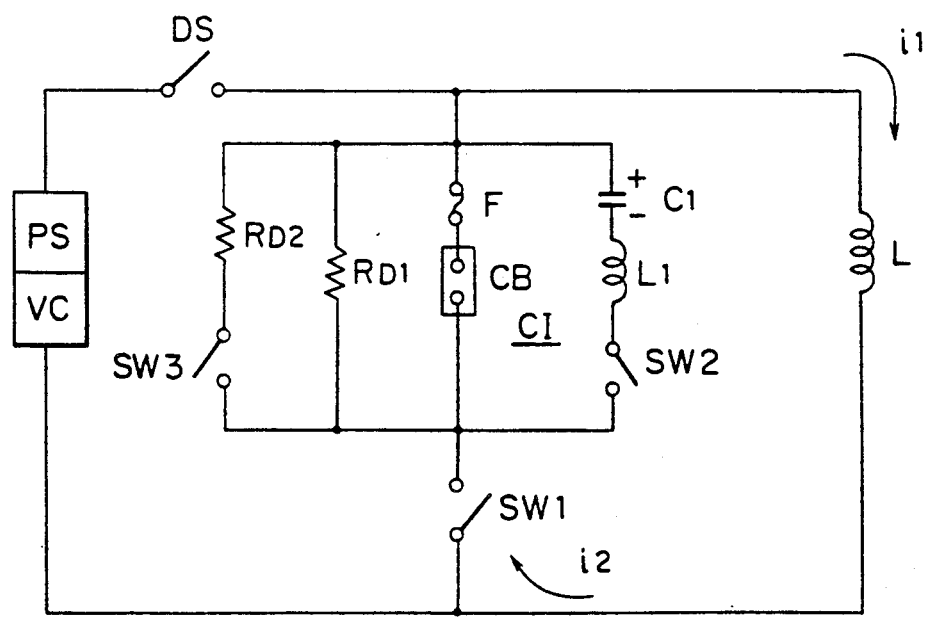
FIG. 10 is a circuit diagram illustrating another embodiment of the present invention in which the diode of FIG. 6 is replaced with a fuse.

FIG. 10 illustrates another embodiment of the protective system of the present invention in which the diode D1 of the current interrupter CI illustrated in FIG. 6 is replaced with a fuse F. In other respects, the arrangement is the same. The current interruption is achieved by opening the circuit breaker CB at the time point when the current through the circuit breaker CB is caused to be zero by the closure of the second switch SW2. This arrangement provides a back up circuit in the sense that, even if the circuit breaker CB fails to interrupt the commutated current, the fuse F can interrupt the current without fail.

Figure 11:
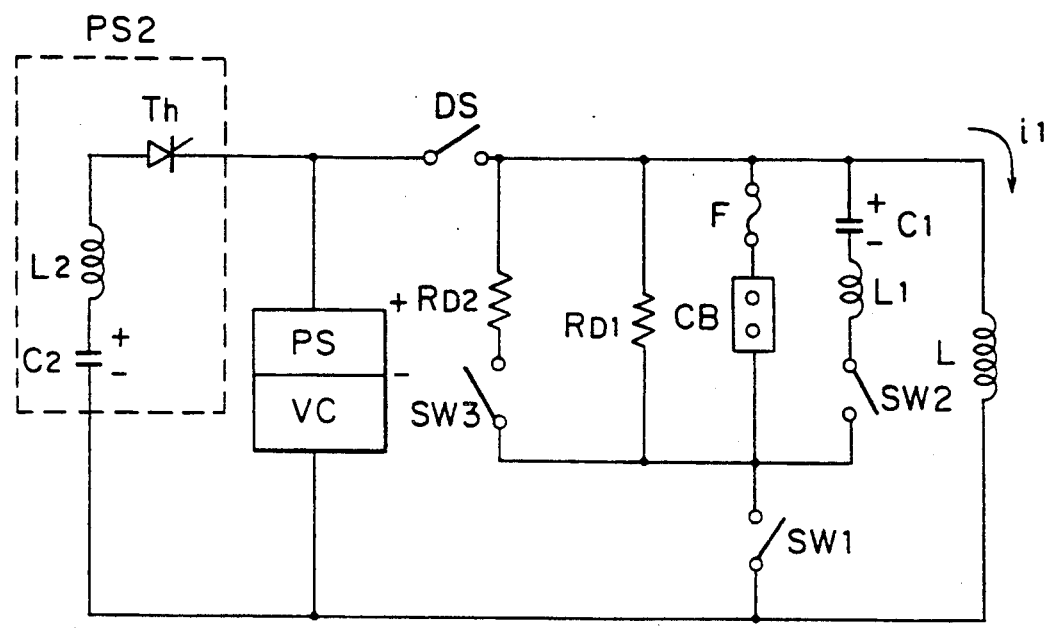
FIG. 11 is a circuit diagram illustrating another embodiment of the present invention in which an additional power source is added to the circuit illustrated in FIG. 10.

FIG. 11 illustrates yet another embodiment of the superconducting coil protective system of the present invention in which an additional power source PS2 is connected in parallel to the unipolar power source PS of the embodiment illustrated in FIG. 10. The second power source PS2 comprises a series circuit composed of a capacitor C2, an inductor L2 and a thyristor Th. In other respects, the protective circuit is the same as that illustrated in FIG. 10. This arrangement is particularly useful in decreasing the commutation time.

When quenching is detected, the output voltage from the unipolar power source PS is decreased and the first switch SW1 is closed. As the current through the superconducting coil L begins to decrease slightly, the current from the unipolar power source PS decreases rapidly and a current flowing through the fuse F increases until the first commutation is completed. During this period of time in which the first commutation is taking place, the thyristor Th is closed to cause a current from the capacitor C2 to flow to rapidly decrease the current from the unipolar first power source PS to zero, whereby the current from the superconducting coil L is completely commutated to the series circuit including the circuit breaker CB. In other respects, the operation of this protective system is the same as that illustrated in FIG. 10.

Figure 12:
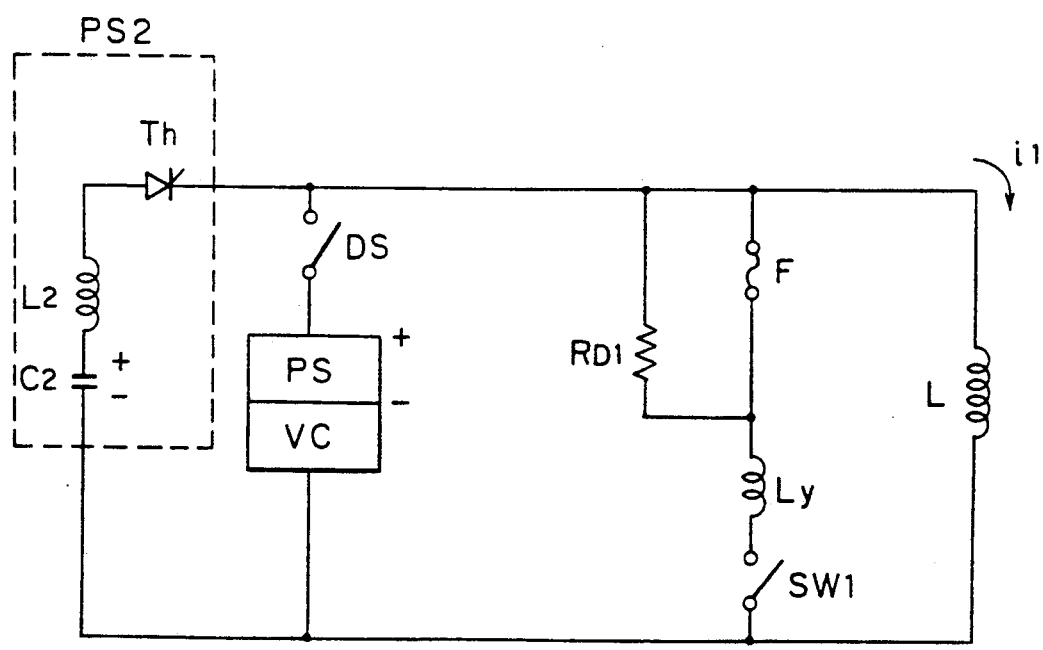
FIG. 12 is a circuit diagram illustrating still another embodiment of the present invention in which an additional power source and an inductance are added to the circuit illustrated in FIG. 8 with an inductance added and the additional protective resistor is eliminated.

FIG. 12 illustrates a further embodiment of the protective system of the present invention which has the same basic structure as that illustrated in FIG. 11, the differences being that the commutation circuit in which the first commutation occurs comprises the first switch SW1, the inductance Ly and the fuse F, that the protective resistor circuit includes the single resistor RD1, and that the disconnector DS is connected to a different position. The operation of the embodiment of FIG. 12 will be readily apparent to those skilled in the art based on the descriptions of the previous embodiments, so a detailed discussion of the operation of this embodiment will be omitted.

What is claimed is:

1. A superconducting coil protective system comprising:
    a power source;
    a super conducting coil connected to said power source;
    quenching detecting means for detecting occurrence of quenching in said superconducting coil and for transmitting and generating a quenching signal indicative of the occurrence of quenching;
    voltage control means for reducing output voltage from said power source in response to the quenching signal;
    current interrupting means connected to said superconducting coil for causing a first commutation of a current from said superconducting coil to said current interrupting means upon the reduction of the output voltage from said power source to a first voltage and for interrupting said first-commutated current;
    a first switch connected in series with said current interrupting means and with said superconducting coil, said first switch being closed in response to the quenching signal; and
    a protective resistor connected in parallel to said current interrupting means which causes energy dissipation when the first-commutated current is interrupted.

2. A superconducting coil protective system as claimed in claim 1, wherein said voltage control means includes means for reversing polarity of the output voltage from said power source.

3. A superconducting coil protective system as claimed in claim 1, further comprising disconnector connected in series with said power source, said disconnector being opened upon said first commutation of the current from the superconducting coil.

4. A superconducting coil protective system as claimed in claim 1, wherein said current interrupter means comprises a second switch and a rectifier connected in series with said second switch.

5. A superconducting coil protective system as claimed in claim 1, wherein said current interrupting means comprises a circuit breaker.

6. A superconducting coil protective system as claimed in claim 1, wherein said current interrupting means comprises a fuse.

7. A superconducting coil protective system as claimed in claim 5, wherein said current interrupting means comprises a diode connected in series with said circuit breaker.

8. A superconducting coil protective system as claimed in claim 5, wherein said current interrupting means comprises a fuse connected in series with said circuit breaker.

9. A superconducting coil protective system as claimed in claim 1, further comprising a commutation resistor connected in series with said power source.

10. A superconducting coil protective system as claimed in claim 1, further comprising a second power source connected in parallel to and having the same polarity as said power source, said second power source supplying electrical power upon the occurrence of quenching in the superconducting coil.

11. A superconducting coil protective method for protecting a superconducting coil connected in parallel to a power source generating an output voltage, comprising the steps of:
    detecting occurrence of quenching in the superconducting coil and generating a quenching signal indicative of the occurrence of quenching;
    reducing an output voltage from the power source in response to the quenching signal from the quenching detecting means to reduce the output voltage to be at least substantially zero;
    causing a first commutation of a current from the superconducting coil to a current interrupting means connected in parallel to the superconducting coil upon the reduction of the output voltage from the power source; and causing a second commutation of the first-commutated current to a protective resistor connected in parallel to the current interrupting means upon the opening of the current interrupting means, whereby energy of the second-commutated current is dissipated in the protective resistor.

12. A superconducting coil protective method as claimed in claim 11, further comprising the step of reversing the polarity of the output voltage.

13. A superconducting coil protective method as claimed in claim 11, further comprising the step of disconnecting the power source upon the first commutation of the current from the superconducting coil.

14. A superconducting coil protective method as claimed in claim 11, further comprising the step of shunting the second-commutated current into a second protective resistor connected in parallel to the protective resistor.

15. A superconducting coil protective system for use which an output voltage generating power source said protective system comprising:

a superconducting coil;

quenching detecting means for detecting occurrence of quenching in said superconducting coil and for generating and transmitting a quenching signal indicative of the occurrence of quenching;

voltage control means for reducing voltage across said superconducting coil in response to the quenching signal;

current interrupting means connected to said superconducting coil for causing a first commutation of a current from said superconducting coil to said current interrupting means upon the reduction of the voltage across said superconducting coil to a first voltage, and for interrupting said first commutated current;

a first switch connected in series with said current interrupting means and in series with said superconducting coil, said first switch being closed in response to the quenching signal transmitted from said quenching detecting means; and a protective resistor connected in parallel to said current interrupting means so that energy is dissipated in said protective resistor when said first commutated current is interrupted.

16. A superconducting coil protective system as claimed in claim 15, wherein said voltage control means includes means for reversing polarity of the voltage across said superconducting coil.

17. A superconducting coil protective system as claimed in claim 15 further comprising a disconnector connected to said superconducting coil and said current interrupting means, said disconnector being opened upon said first commutation of the current from said superconducting coil.

18. A superconducting coil protective system as claimed in claim 15 wherein said current interrupter means comprises a second switch and a rectifier connected in series with said second switch.

19. A superconducting coil protective system as claimed in claim 15 wherein said current interrupting means comprises a circuit breaker.

20. A superconducting coil protective system as claimed in claim 19 wherein said current interrupting means comprises a diode connected in series with said circuit breaker.

21. a superconducting coil protective system as claimed in claim 19, further comprising a second protective resistor and a second switch, said switch being connected to said second protective resistor and comprising a series branch, the series branch being connected in parallel to said protective resistor.

22. A superconducting coil protective system as claimed in claim 21 wherein said current interrupting means comprises a fuse connected in series with said circuit breaker.

23. A superconducting coil protective system as claimed in claim 19 wherein said current interrupting means comprises a fuse connected in series with said circuit breaker.

24. A superconducting coil protective system as claimed in claim 15 wherein said current interrupting means comprises a fuse.

25. A superconducting coil protective system as claimed in claim 15 further comprising a second protective resistor and a second switch, said switch being connected in series to said second protective resistor and comprising a series branch and the series branch being connected in parallel to said protective resistor.

26. A superconducting coil protective system as claimed in claim 15 further comprising a commutation resistor connected to said superconducting coil and to said current interrupting means.

27. A superconduting coil protective system comprising:

a power source;

a superconducting coil;

quenching detecting means for detecting occurrence of quenching in said superconducting coil and for generating and transmitting a quenching signal indicative of the occurrence of quenching;

voltage control means for reducing output voltage from said power source in response to said quenching signal;

current interrupting means connected to said superconducting coil for causing a first commutation of a current from said superconducting coil to said current interrupting means upon the reduction of the output voltage from said power source to a first voltage, and for interrupting said first commutated current;

a first switch connected in series with said current interrupting means and in series with said superconducting coil, said first switch being closed in response to the quenching signal transmitted from said quenching detecting means, a first protective resistor connected in parallel to said current interrupting means;

a second protective resistor and a switch connected in series comprising a series branch, the series branch being connected in parallel with said first protective resistor.

28. A superconducting coil protective system comprising:

a power source;

a superconducting coil;

quenching detecting means for detecting occurrence of quenching in said superconducting coil and for generating and transmitting a quenching signal indicative of the occurrence of quenching;

voltage control means for reducing output voltage from said power source in response to said quenching signal;

current interrupting means connected to said superconducting coil for causing a first commutation of a current from a said superconducting coil to said current interrupting means upon the reduction of the output voltage from said power source to a first voltage, and for interrupting said first commutated current, said current interrupting means comprising a circuit breaker;

a first switch connected in series with said current interrupting means and in series with said superconducting coil, said first being closed in response to the quenching signal transmitted from said quenching detecting means;

a first protective resistor connected in parallel to said current interrupting means;

a second protective resistor and a switch connected in series comprising a series branch, the series branch being connected in parallel with said first protective resistor.

29. A superconducting coil protective system as claimed in claim 28, wherein said current interrupting means comprises a fuse connected in series with said circuit breaker.

30. A superconducting coil protective system as claimed in claim 29, further comprising a second power source connected in parallel to and in having the same polarity as said power source, said second power source supplying electrical power upon the occurrence of quenching in the superconducting coil.

* * * * *

UNITED STATES PATENT AND TRADEMARK OFFICE
CERTIFICATE OF CORRECTION

PATENT NO. : 5,210,674
DATED : May 11, 1993
INVENTOR(S) : Yamaguchi et al.

It is certified that error appears in the above-identified patent and that said Letters Patent is hereby corrected as shown below:

Claim 3, col. 8, line 24, after "comprising" insert --a--;

Claim 15, column 9, line 22, delete "which" and insert --with--.

Claim 28, col. 11, line 3, delete "a" (second occurrence).

Claim 29, col. 12, lien 11, delete "in" (second occurrence).

Signed and Sealed this

Fifteenth Day of February, 1994

BRUCE LEHMAN

*Attest:*

*Attesting Officer*    Commissioner of Patents and Trademarks